UNITED STATES PATENT OFFICE.

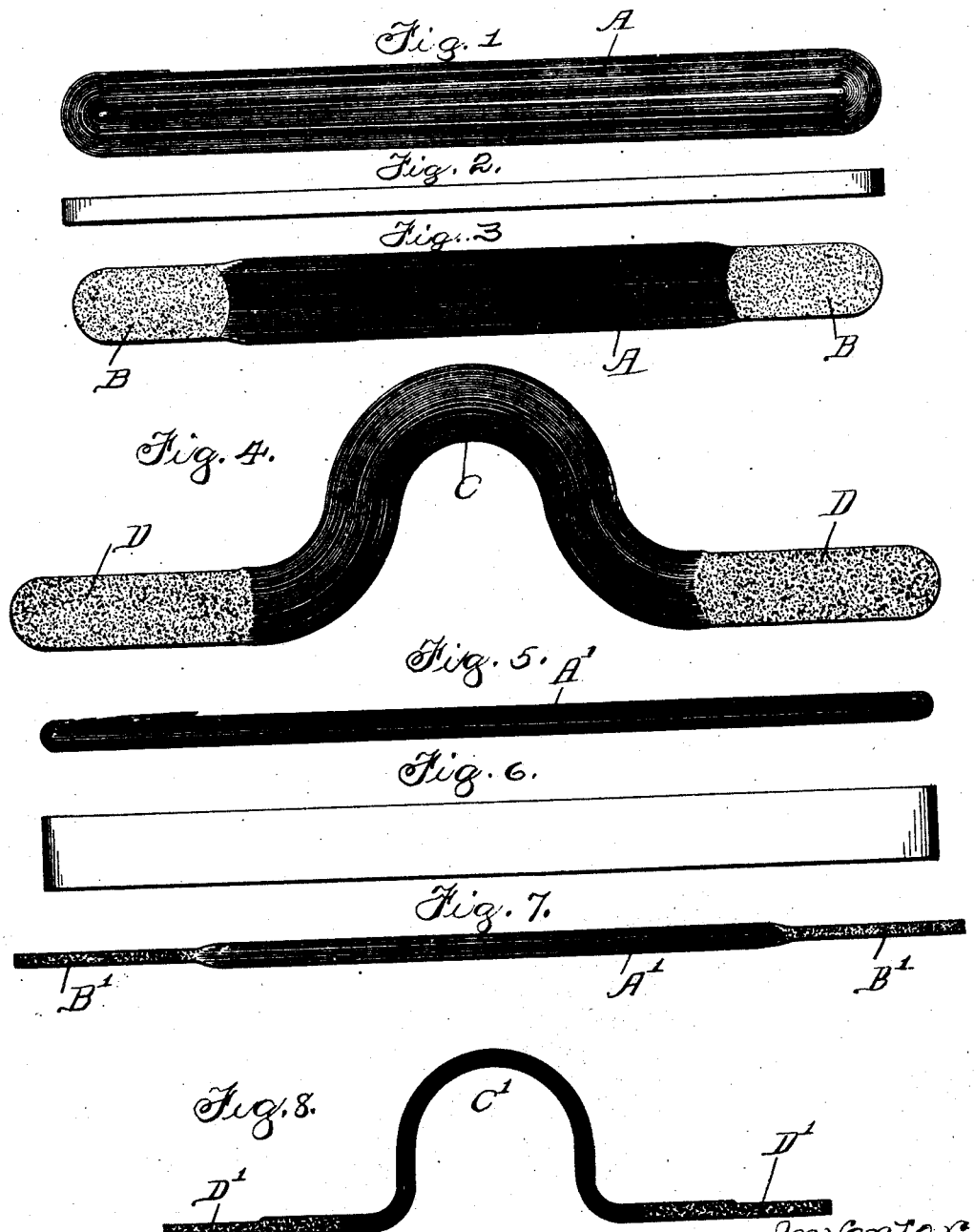

GEORGE A. MEAD, OF MANSFIELD, OHIO.

MANUFACTURE OF RAIL-BONDS.

No. 854,099.

Specification of Letters Patent.

Patented May 21, 1907.

Application filed February 25, 1904. Serial No. 195,135.

*To all whom it may concern:*

Be it known that I, GEORGE A. MEAD, a citizen of the United States, residing at Mansfield, in the county of Richland and State of Ohio, have invented a new and useful Improvement in the Manufacture of Rail-Bonds, of which the following is a specification.

This invention relates to manufacture of rail bonds.

The object of the invention is to provide a method of operation in the manufacture of rail bonds which is simple and efficient, wherein rail bonds are produced economically and with flat homogeneous feet integral with the body thereof while such body is composed of strips, so that the device may be applied flatwise upon the surface of the rails to be joined thereby.

A further object of the invention is to improve the manufacture of rail bonds and to produce a bond which may be quickly and efficiently applied without the use of terminal studs to the rails.

Other objects of the invention will appear more fully hereinafter.

The invention consists substantially in the mode of operation as will be more fully hereinafter set forth, as shown in the accompanying drawing, and finally pointed out in the appended claims.

Referring to the accompanying drawing, and to the various views and reference signs appearing thereon,—Figure 1 is a view in plan of a bundle of strips, strands or laminations, illustrating the first step in my improved method of operation in the manufacture of rail bonds. Fig. 2 is an edge view of the construction shown in Fig. 1. Fig. 3 is a view similar to Fig. 1, illustrating the action of the second step of my method, whereby the ends of the bundle of strips, strands or laminations are compressed or welded into solid homogeneous masses to form the flat feet of the bond. Fig. 4 is a view similar to Fig. 3, showing the completed bond, with a bend formed in the bond intermediate its ends to afford the desired flexibility to compensate for expansion and contraction of the rails to which the bond may be applied, and showing the integral flat feet with a coating of solder applied thereto. Figs. 5, 6, 7 and 8 are views similar to Figs. 1, 2, 3 and 4, respectively, showing the manner of carrying out my invention in connection with the manufacture of bonds of a somewhat different style, wherein the bond is applied in a somewhat different manner to the rails.

I propose to weld the extremities of the bond into a solid homogeneous mass and into shape to form flat feet for application of the bond to the rails. This method of manufacture of bonds may be carried out in bonds having different contours or constructions of body portions, and adapted to a wide variety of situations in which ordinary rail bonds cannot be employed, and in the drawing I have illustrated in Figs. 1, 2, 3, and 4 the application of my invention to a form of rail bond wherein the strips or laminations composing the body of the bond lie edgewise with respect to the surface of the rail when the bond is applied to the rail and with the flat feet lying against the surface of the rail and the side surfaces thereof occupying substantially the same plane of the side surfaces of the body portion of the bond, and in Figs. 5, 6, 7 and 8 I have shown the steps in the method of manufacture of a rail bond having flat feet, wherein the strips or laminations composing the body of the bond are applied flatwise with reference to the rails and the flat feet resting against the surface of the rails, but it will be obvious that the same principle of manufacture is embodied in each case, and it will be equally obvious that the same principles may be embodied in the manufacture of bonds of other constructions and arrangements.

In carrying out my invention, I first assemble the strips, strands or laminations to compose the body of the bond in any suitable or convenient manner. For instance, as shown in Fig. 1, this assembling of the strips, strands or laminations is shown as effected by winding a strip or strand of conducting material upon itself to form a body portion A, of the desired or required length, although I do not desire to be restricted or limited to the manner of assembling the strips, strands or laminations composing the bond. When the strips, strands or laminations composing the body of the bond have been assembled I form the ends thereof in any suitable or convenient manner into substantially solid homogeneous masses, as indicated at B. This step may be carried out by subjecting the ends of the body A of the bond to a welding heat and pressure applied thereto flatwise or in a direction edgewise with respect to the planes of the strips, strands or laminations composing the body portion, thereby forming the end portions B into flat solid homogeneous masses. The body portion of the bond is then provided with suitable shape or configuration, as, for instance, by being bent or deflected into substantially U or other shape intermediate the ends thereof, as indicated at C, Fig. 4, and if desired, and in order to facilitate the application of the bond to the rails, the solid homogeneous flattened end portions may be coated with a suitable solder, as indicated at D, or other substance capable of securing efficient electrical contact and adherence of the bonds to the surfaces of the rails to which they are to be applied.

In Figs. 5, 6, 7 and 8 I have shown the same method of operation carried out in the manufacture of rail bonds, wherein a wider ribbon or strip of conducting material is employed to form the body portion A of the bond, and wherein the body of the bond is to be applied to the rails with the strips or laminations composing the body portion occupying flatwise relation with respect to the surface of the rails. The ends of the body portion A' of the bond are formed into solid homogeneous masses by welding the same or the application of pressure thereto, or both, or otherwise, to form the flat feet B', in the same manner as above described with reference to the manufacture of bonds as illustrated in Figs. 1, 2, 3 & 4, and the bond is finally completed by forming the body portion thereof into suitable shape or configuration, as, for instance, by forming a loop portion C' therein at a point intermediate the solid ends D' thereof, such loop or bend being formed in such relation that the flat feet B' may be applied to the rails flatwise with respect to the strips or bands composing the body portion of the bond, and in similar manner to that above described with reference to Fig. 4 the solid terminal ends D' may be coated with a suitable solder or other adhering metal. If desired, and in order to prevent oxidation of the copper while in a molten state or highly heated condition, preparatory to the operation of welding the ends of the strips, strands or laminations into a homogeneous mass, I employ a flux, which may be of any suitable or well known kind capable of securing the desired objects.

If desired, in the operation of compressing and welding the ends of the body portion to form the solid homogeneous feet, a greater degree of pressure may be applied to the extremities of the terminals than to said terminals at a point nearer the junction therewith of the body portion of the bond, thereby reducing the cross-sectional area of the terminal to a greater extent at the extremity thereof than at a point nearer the body of the bond, as clearly indicated in the drawings.

It is obvious that many variations and changes in the details of operation would readily occur and suggest themselves to persons skilled in the art and still fall within the spirit and scope of my invention. I do not desire, therefore, to be limited or restricted to the exact details shown and described.

I am aware that it has heretofore been proposed to form rail bonds by pressing, to a welding degree, a plurality of strands or wires; but such is not the equivalent of my invention, and I therefore do not wish to be understood as claiming the same, because it is impossible to pack round wires so closely together, without enormous pressure, as to entirely expel and exclude the air from between them and it is well known that the presence of air between the surfaces results in oxidation during the welding process and prevents perfect fusion of the strands, and such oxidation increases the resistance of the bond to a degree which becomes material when multiplied thousands or even hundreds of times throughout the line of the road. With the flat, superposed strips however, the first application of pressure entirely expels the air when cold pressed, leaving the surfaces bright and ripe for welding and perfect fusion when heat is applied.

But having now set forth the object and nature of my invention, and a construction embodying the principles thereof, what I claim as new and useful and of my own invention, and desire to secure by Letters Patent, is:

The method of manufacturing rail bonds, which consists in winding a flat strip of conducting material upon itself to form a body portion, then heating the extremities, and compressing said extremities flatwise to form the same into solid homogeneous masses.

In witness whereof, I have hereunto set my hand this twenty third day of February 1904, in the presence of the subscribing witnesses.

GEORGE A. MEAD.

Witnesses:
F. W. MILLER,
A. L. PRICE.